US008437753B2

United States Patent
Kim et al.

(10) Patent No.: US 8,437,753 B2
(45) Date of Patent: May 7, 2013

(54) METHOD FOR MANAGING NEIGHBOR BASE STATION INFORMATION IN MOBILE COMMUNICATION SYSTEM AND SYSTEM THEREOF

(75) Inventors: Gyou-Hwan Kim, Suwon-si (KR);
Jun-Hwan Oh, Seongnam-si (KR);
Gwang-Eun Kim, Seoul (KR);
Seon-Goo Hwang, Yongin-si (KR);
Yu-Gun Kim, Yongin-si (KR);
Kyung-Jin Kim, Seongnam-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 154 days.

(21) Appl. No.: 12/927,003

(22) Filed: Nov. 4, 2010

(65) Prior Publication Data
US 2011/0111749 A1    May 12, 2011

(30) Foreign Application Priority Data
Nov. 10, 2009  (KR) .................. 10-2009-0108052

(51) Int. Cl.
*H04W 24/00*    (2009.01)

(52) U.S. Cl.
USPC ........... 455/434; 455/403; 455/410; 455/436; 455/445; 455/435.1; 370/329; 370/254

(58) Field of Classification Search ................... 455/434
See application file for complete search history.

(56) References Cited

U.S. PATENT DOCUMENTS

| | | | |
|---|---|---|---|
| 2007/0254620 A1* | 11/2007 | Lindqvist et al. | 455/403 |
| 2010/0228967 A1* | 9/2010 | Hahn et al. | 713/155 |
| 2010/0260068 A1* | 10/2010 | Bhatt et al. | 370/254 |
| 2010/0267386 A1* | 10/2010 | Lim et al. | 455/436 |

* cited by examiner

*Primary Examiner* — Meless N Zewdu
*Assistant Examiner* — Jean Chang

(57) ABSTRACT

There are provided a method for managing neighbor Base Station (BS) information in a mobile communication system, and a system thereof. A femto Access Service Network-Gateway (ASN-GW) controls at least one femto BS, manages scan information that an MS served by a macro BS requires in measuring at least one signal strength by scanning the at least one femto BS, creates the scan information in a format of Downlink Channel Descriptor (DCD) and Uplink Channel Descriptor (UCD) information, and transmits the scan information to the macro BS. The macro BS periodically broadcasts neighbor BS information of the femto BS, which includes the scan information, to MSs in its coverage using a Neighbor Advertisement (NBR-ADV) message.

20 Claims, 5 Drawing Sheets

METHOD FOR MANAGING NEIGHBOR BASE STATION INFORMATION IN MOBILE COMMUNICATION SYSTEM AND SYSTEM THEREOF

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Nov. 10, 2009 and assigned Serial No. 10-2009-0108052, the entire disclosure of which is hereby incorporated by reference.

TECHNICAL FIELD OF THE INVENTION

The present invention relates generally to a mobile communication system and, more particularly, to a method for managing neighbor Base Station (BS) information and a system thereof.

BACKGROUND OF THE INVENTION

There is an increasing demand for data packet services over a wireless communication system, and data packet services have been widely used. In order for data packet services to be used more efficiently, micromini mobile communication BSs have been installed in indoor environments such as home and office. The micromini mobile communication BSs installed in indoor environments are generally called a home BS (or in-building BS) or a femto BS, and users may freely enjoy wire/wireless communication services on Mobile Stations (MSs) or Mobile Subscriber Stations (MSSs) within a femto cell, which is a coverage or a service zone of the femto BS. On the other hand, a BS and a cell having the normal function and coverage are called a macro BS and a macro cell, respectively.

Mobile Worldwide Interoperability for Microwave Access (WiMAX) supports femto BSs having transmit power of 100 mW (20 dBm) or below to provide high-quality high-speed wireless Internet access services in the home and office environments, which is similar to providing the services over a macro BS having high transmit power of 20 W (43 dBm) or below. Unlike the macro BS having a cell radius of several kilometers, the femto BS has a cell radius of several meters to several tens of meters as its coverage and is installed in the home or office, maximizing the frequency reuse in the radio environment and thus providing the high-quality high-speed wireless Internet access services at significantly low prices compared with the macro network. The femto BS may communicate with MSs using the same air interface standard as that of the macro BS, such as, for example, IEEE 802.16e or IEEE 802.16m.

In order to guarantee service continuity for an MS while traveling between BSs, each BS is required to provide the MS with radio configuration information for its neighbor BSs. Unlike the existing macro network in which each BS has a maximum of ten neighbor BSs, the femto scenario provides a network environment in which one macro BS has hundreds or thousands of femto BSs as neighbor BSs or handover candidate BSs, which exist in its broad coverage having a radius of several square kilometers.

In this case, to manage and update information about neighbor BSs, each macro BS generally exchanges messages with a maximum of several thousands of neighbor femto BSs, which can be hardly achieved with performance of the hardware used in the communication equipment. Likewise, an Access Service Network-Gateway (ASN-GW) in the macro network, which interworks with hundreds of macro BSs, should also handle a very large number of messages in proportion to the number of managed macro BSs.

SUMMARY OF THE INVENTION

To address the above-discussed deficiencies of the prior art, it is a primary object to provide at least the advantages described below. Accordingly, an aspect of exemplary embodiments of the present invention is to provide a method for supporting handover between a macro BS and a femto BS, and a system thereof.

Another aspect of exemplary embodiments of the present invention is to provide a method for updating and managing neighbor BS information for femto BSs to support handover from a macro BS to a femto BS, and a system thereof.

In accordance with one aspect of the present invention, there is provided a method for managing neighbor Base Station (BS) information in a mobile communication system, in which a femto Access Service Network-Gateway (ASN-GW) managing at least one femto BS, manages scan information that a Mobile Station (MS) needs in measuring at least one signal strength by scanning the at least one femto BS, the femto ASN-GW creates the scan information in a format of Downlink Channel Descriptor (DCD) and Uplink Channel Descriptor (UCD) information and transmits the scan information to a macro BS serving the MS, and the macro BS periodically broadcasts neighbor BS information including the scan information to MSs in its coverage using a Neighbor Advertisement (NBR-ADV) message.

In accordance with another aspect of the present invention, there is provided a mobile communication system for managing neighbor Base Station (BS) information. In the system, a macro BS serves a Mobile Station (MS) in its coverage, and a femto Access Service Network-Gateway (ASN-GW) controls at least one femto BS, manages scan information that an MS needs in measuring at least one signal strength by scanning the at least one femto BS, creates the scan information in a format of Downlink Channel Descriptor (DCD) and Uplink Channel Descriptor (UCD) information, and transmits the scan information to the macro BS. The macro BS periodically broadcasts neighbor BS information of the femto BS, which includes the scan information, to MSs in its coverage using a Neighbor Advertisement (NBR-ADV) message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In this disclosure, a neighbor BS information management and update operation in a mobile communication system will be described with reference to the communication standard based on IEEE 802.16e or 16m. However, it will be understood by those of ordinary skill in the art that the neighbor BS information management and update operation according to the present invention is not limited to a specific communication protocol or system configuration, and various changes in form and details may be made without departing from the spirit and scope of the invention.

Now, a description will be made of a neighbor cell radio configuration update procedure needed to provide handover that an MS in communication with a macro BS performs to receive seamless service when moving to another macro BS or femto BS.

Figure 1:
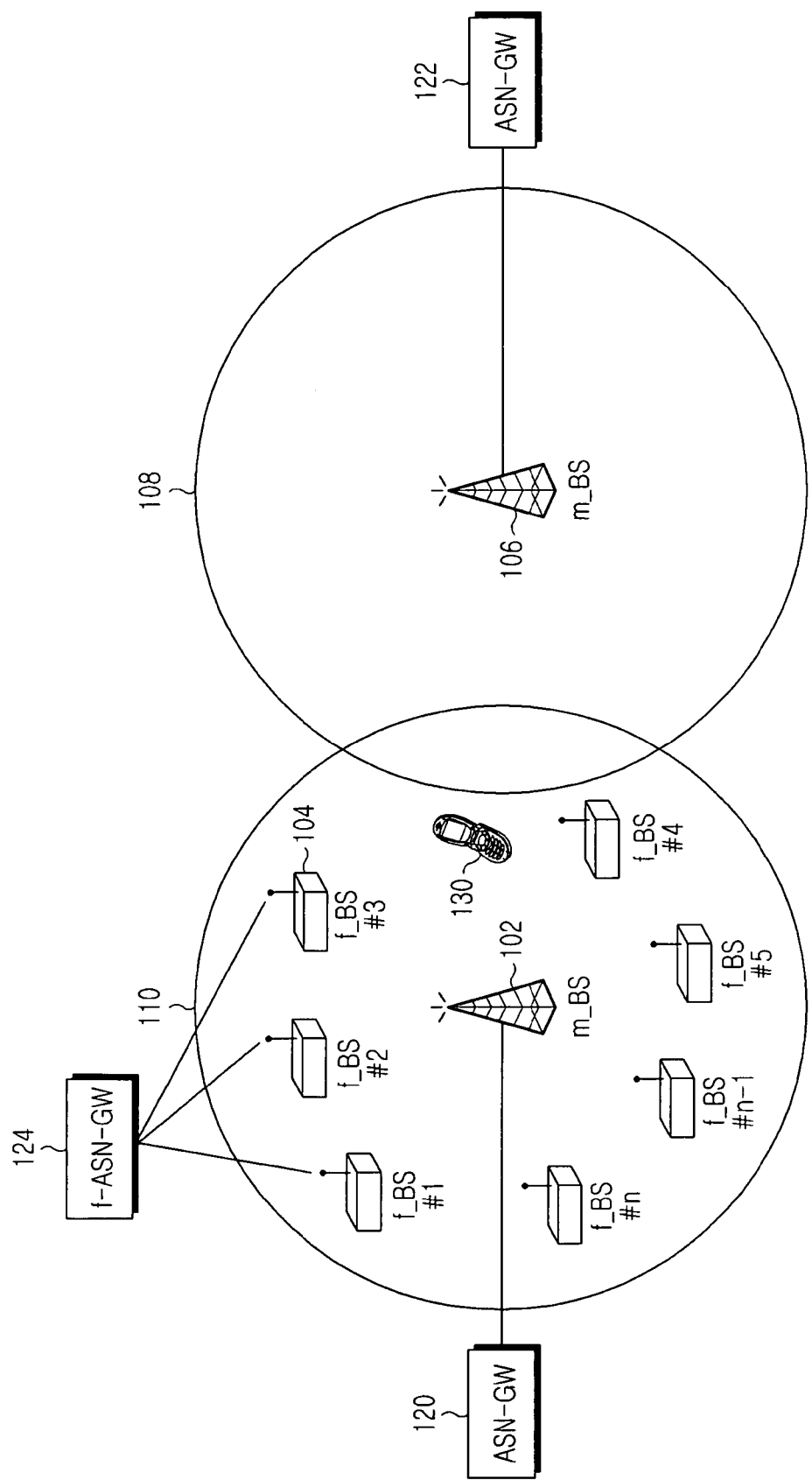
FIG. 1 is a block diagram showing a schematic configuration of a mobile communication system according to an exemplary embodiment of the present invention.

FIG. 1 shows a schematic configuration of a mobile communication system according to an exemplary embodiment of the present invention.

As illustrated, each macro BS m_BS 102 and 106 has a coverage 110 and 108, and wirelessly accesses an MS 130 located in the coverage 110 and 108 to provide a communication service thereto. In the coverage 110 and 108, one or more femto BSs f_BS 104 can exists forming a femto network, and each femto BS 104 has very small coverage and provides a communication service to users registered in a designated coverage.

Each macro BS 102 and 106 and its femto BSs 104 constitute one or more Access Service Networks (ASNs) for the users. Each ASN is managed and controlled by associated Access Service Network Gateways (ASN-GWs) (also called BS controllers) 120, 122 and 124. In the example shown in FIG. 1, the macro BSs 102 and 106 are managed by different ASN-GWs 120 and 122, respectively. Commonly, each femto BS 104 is managed by a femto ASN-GW f_ASN-GW 124 constituting the femto network. Each ASN-GW 120 and 122 generally collects traffic from two layers in its ASN and connects them to an upper network, and additionally, takes charge of location management and paging in the ASN, wireless resource management and admission control, cashing of subscriber profile and encryption keys, establishment and management of a mobility tunnel to BSs, and routing to an external node whose Quality of Service (QoS) and policy enforcement are selected.

The MS 130 may perform communication by accessing the macro BS 102 or the femto BS 104 in which the MS 130 itself is registered. If the MS 130 leaves the coverage 110 of the macro BS 102 and enters the coverage 108 of another macro BS 106 while in communication with the macro BS 102, handover in a macro network occurs. On the other hand, if the MS 130 enters coverage of the femto BS 104 in which the MS 130 is registered while in communication with the macro BS 102, handover from a macro network to a femto network occurs. In order to support such a handover, the MS 130 needs to get in advance the information required to access neighbor BSs to which the MS 130 can move.

In order for the system to transfer to the MS 130 the essential information for a radio channel that the MS 130 requires in setting up connections to the BSs 102, 104 and 106, the Mobile WiMAX network uses a Downlink Channel Descriptor (DCD) message and an Uplink Channel Descriptor (UCD) message. The BSs 102, 104 and 106 not only periodically transmit DCD/UCD messages including their radio channel information for an initial access by the MS 130, but also periodically transmit DCD/UCD information of neighbor BSs along with BS Identifiers (BS IDs) of the neighbor BSs using a Neighbor Advertise (NBR-ADV) message in order to assist an access to the neighbor BSs through handover. The DCD/UCD information refers to radio channel information to be included in the DCD/UCD messages, and is considered as neighbor BS information when provided to other BSs. In the NBR-ADV message, the DCD/UCD information or neighbor BS information is identified by associated BS IDs.

Each of the BSs 102 and 104 in the macro network acquires information about radio channels of the neighbor BSs by exchanging a Radio Configuration Update Request (Radio_Config_Update_Req) message and a Radio Configuration Update Report (Radio_Config_Update_Rpt) message.

Figure 2:
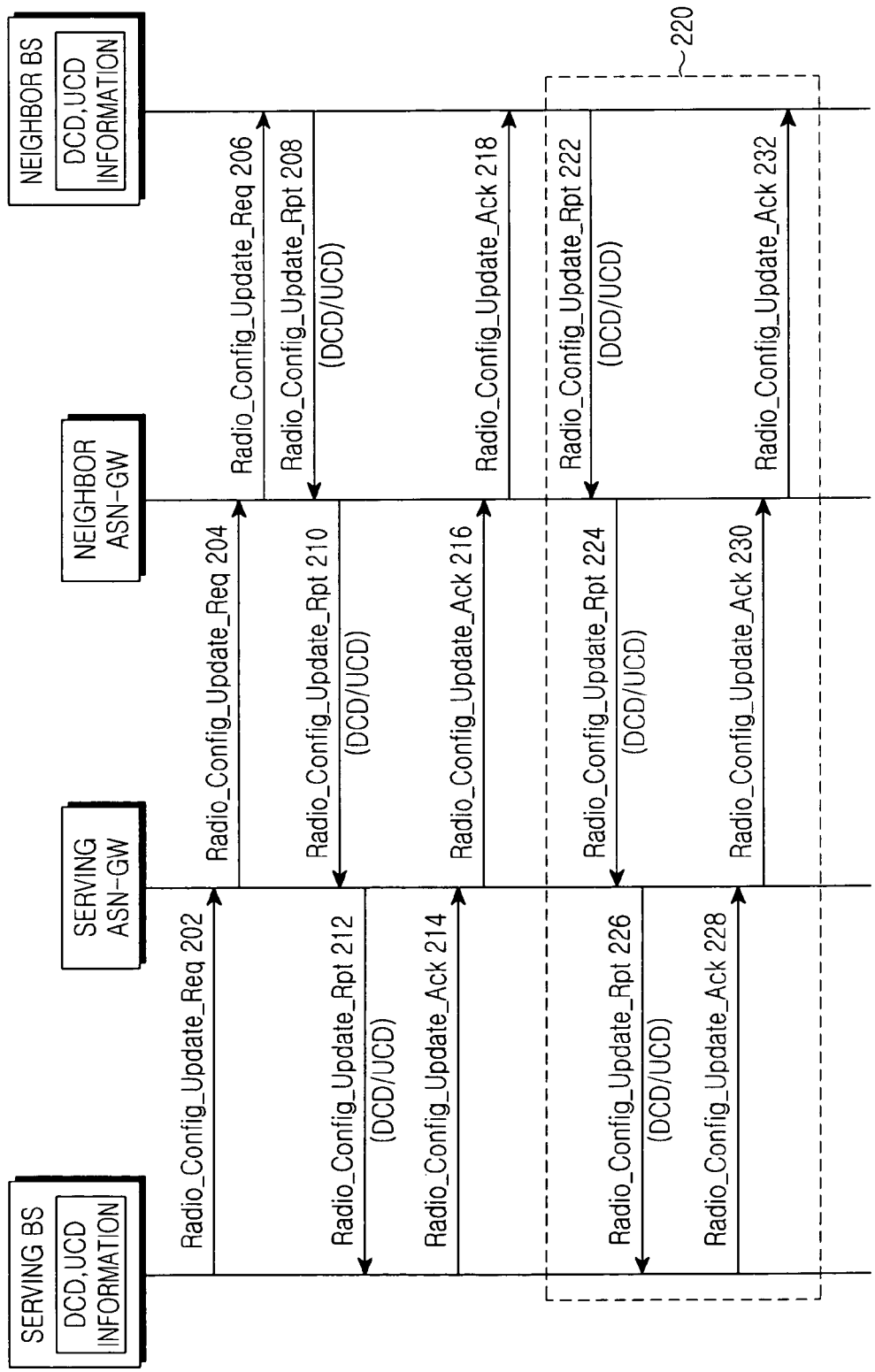
FIG. 2 is a message flow diagram showing a neighbor BS information update procedure in a macro network.

FIG. 2 shows a neighbor BS information update procedure in a macro network.

Referring to FIG. 2, in message flows 202, 204 and 206, a serving macro BS transmits a Radio_Config_Update_Req message to each neighbor macro BS through a serving ASN-GW and a neighbor ASN-GW. In message flows 208, 210 and 212, the neighbor BS provides its DCD/UCD information to the serving BS via the neighbor ASN-GW and the serving ASN-GW using a Radio_Config_Update_Rpt message. In message flows 214, 216 and 218, the serving BS transmits a Radio_Config_Update_Ack message to the neighbor BS via the serving ASN-GW and the neighbor ASN-GW to indicate the successful receipt of the DCD/UCD information.

Even though there is no request from the serving BS, each neighbor BS may provide its DCD/UCD information to the service BS in a periodic or event-driven manner according to a predefined report scheme at block 220. That is, in message flows 222, 224 and 226, each neighbor BS delivers a Radio_Config_Update_Rpt message containing its DCD/UCD information to the serving BS, and in message flows 228, 230 and 232, the serving BS responds with a Radio_Config_Update_Ack message. The serving BS creates neighbor BS information with the DCD/UCD information of neighbor BSs, which the serving BS has collected through the above procedure, and broadcasts the neighbor BS information to MSs in the serving BS's cell, allowing the MSs to refer to the neighbor BS information when performing handover to any one of the neighbor BSs.

As described above, in the macro network, ASN-GWs simply forward the Radio_Config_Update_Req and Radio_Config_Update_Rpt messages received from their BSs to the other BSs without addition of new information and change in the included existing information.

Meanwhile, in the case of a femto network, in order to detect the radio environment and optimize the performance, each femto BS may perform a Self-Organization Network (SON) function of updating its radio channel information by itself. As an example, a femto BS performs an interference mitigation function to prevent interference signals from being excessively generated unnecessarily. As to the interference mitigation function, a femto BS adjusts its transmit power based on the measured interference signals from the neighbor BSs, and the results are reflected in BS Effective Isotropically Radiated Power (EIRP) included in a DCD message so that an MS may calculate a signal attenuation occurring in a radio session with its BS.

Generally, since the SON function is periodically performed to cope with a change in radio environment, some radio channel information of the femto BS is often dynamically changed compared with the radio channel information of the macro BS, which is changed by an operator. The change in some essential radio channel information, such as BS EIRP, due to the SON function should be reflected not only in a DCD message of the femto BS, but also in an NBR-ADV message that the macro BS transmits, which has coverage including a region where the femto BS is installed, in order to perform handover from the macro BS to the femto BS.

Meanwhile, due to its limited performance, an MS may measure Received Signal Strength Indicator (RSSI) and Carrier to Interference and Noise Ratio (CINR) by detecting signals from about 32 neighbor BSs. Therefore, femto BSs installed in the coverage of one macro BS should reuse a maximum of 32 preamble indexes. Even though the performance constrains of the MS are increasingly alleviated with the development of hardware, the reuse of the preamble indexes is inevitable because it is impossible to allocate unique preamble indexes to all of thousands of femto BSs. For example, when a bandwidth of 10 MHz is used, which is the most common bandwidth in the IEEE 802.16e standard, only 114 preamble indexes are defined.

In this signal detection process, due to the circumstances where preamble indexes used to distinguish BSs cannot but be allocated to several femto BSs in a duplicate way, it is impossible for a macro BS to transmit to an MS the radio channel information such as BS EIRP, which can be changed from time to time by the SON function, for each femto BS. This is because the macro BS may not determine which of the femto BSs sharing the same preamble index is detected by the MS. Even if a sufficient number of preamble indexes have been defined, transmitting information about thousands of radio channels by a macro BS may cause fatal adverse effects on the radio capacity of the macro BS. In conclusion, performing the neighbor BS information update procedure of FIG. 2 between a macro BS and its all femto BSs to acquire radio channel information, which may be different for each femto BSs, may bring undesired performance degradation.

In the following description, an embodiment of the present invention is directed to a neighbor BS information update procedure for minimizing the possible effects on a macro BS and a BS controller in supporting handover from a macro BS to a femto BS in a Mobile WiMAX network.

In FIG. 2, only each BS manages the radio channel information included in the DCD/UCD messages. To the contrary, however, in the below-described embodiment of the present invention, of the radio channel information included in DCD/UCD messages of a femto BS, the information that an MS requires in measuring the signal strengths (e.g., RSSIs and CINRs) by scanning neighbor BSs, i.e., center frequency, preamble index, bandwidth, Fast Fourier Transform (FFT) size, and frame duration, are managed not only in the femto BS but also in the femto ASN-GW as data changeable by the system operator. Herein, the information that an MS requires in scanning neighbor BSs will be referred to as scan information (SCAN INFO).

Of the scan information, the center frequency and preamble index are values reused by the femto BSs as described above. Therefore, the number of pairs of center frequencies and preamble indexes, which should be managed, is limited to a maximum of several dozens. For example, when an MS can scan 32 BSs, some 16 pairs of center frequencies and preamble indexes except for those of the neighbor BSs belonging to the macro network may be allocated to the femto BSs. In this case, therefore, the femto ASN-GW manages about 16 pairs of center frequencies and preamble indexes as configuration information of the femto network.

Like the preamble index, when BS IDs of the macro network are reused in a femto network, even a BS ID of each femto BS is included in the SCAN INFO managed in the femto ASN-GW together with the center frequency and preamble index. In this way, the details included in the scan information may be determined based on the MS performance, air interface, system operator's choice, etc.

Figure 3:
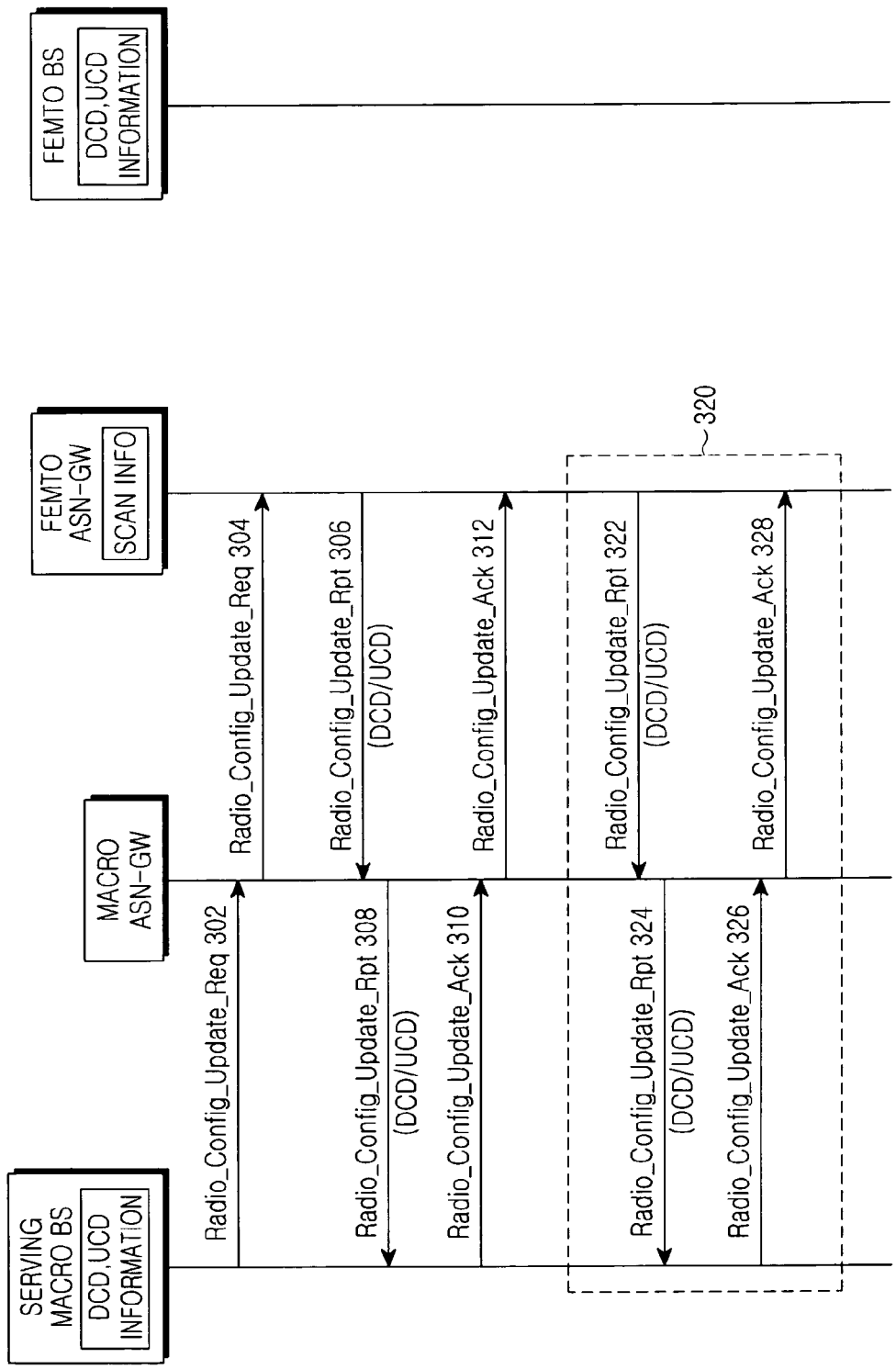
FIG. 3 is a message flow diagram showing a neighbor BS information update procedure for supporting handover from a macro network to a femto network according to an exemplary embodiment of the present invention.

FIG. 3 shows a neighbor BS information update procedure for supporting handover from a macro network to a femto network according to an exemplary embodiment of the present invention.

Referring to FIG. 3, a serving macro BS transmits a Radio_Config_Update_Req message to a macro ASN-GW in message flow 302, and the Radio_Config_Update_Req message is forwarded to a femto ASN-GW in message flow 304. The femto ASN-GW retrieves from a memory the scan information that the femto ASN-GW has stored for each of its femto BSs in advance, instead of forwarding the Radio_Config_Update_Req message to the femto BSs.

In message flows 306 and 308, the femto ASN-GW provides the scan information retrieved for its femto BSs to the serving macro BS through the macro ASN-GW in the form of DCD/UCD information using a Radio_Config_Update_Rpt message. The DCD/UCD information may include scan information for all femto BSs managed by the femto ASN-GW, or may include scan information only for at least one femto BS that can become a target BS for the serving macro BS.

In message flows 310 and 312, the serving macro BS transmits a Radio_Config_Update_Ack message to the femto ASN-GW through the macro ASN-GW to indicate the successful receipt of the DCD/UCD information, and the femto ASN-GW directly handles the Radio_Config_Update_Ack message without forwarding it to its femto BSs. Thereafter, the serving macro BS broadcasts the DCD/UCD information including scan information of neighbor femto BSs to an MS accessing the information using an NBR-ADV message, allowing the MS to use the DCD/UCD information when determining whether to perform handover to neighbor femto BSs.

Even though there is no request from the serving macro BS, the femto ASN-GW may provide scan information for the femto BSs to the serving BS in a periodic or event-driven manner according to a predefined report scheme. That is, if a predefined report condition is satisfied, the femto ASN-GW transmits scan information for the femto BSs to the serving macro BS in the form of DCD/UCD information using a Radio_Config_Update_Rpt message without a request from the serving macro BS at block 320 in message flows 322 and 324, and the serving macro BS responds with a Radio_Config_Update_Ack message in message flows 326 and 328.

In this way, instead of simply bypassing the Radio_Config_Update_Req and Radio_Config_Update_Rpt messages, the femto ASN-GW transmits its scan information to the macro network using a Radio_Config_Update_Rpt message. In the case where to normally support handover to a femto BS, the serving macro BS should receive all information included in the DCD/UCD messages, for example, ranging period, handover ranging code, BS EIRP, and Downlink/Uplink (DL/UL) burst profile, all the DCD/UCD information except for the scan information may be transmitted to the serving macro BS. In the transmitted DCD/UCD information, values except for the scan information are set as arbitrary values within a range defined in the standard without being managed as configuration information changeable by the system operator. To allow an MS to detect a change in DCD/UCD messages, values of DCD Configuration Change Count (CCC) and UCD CCC indicating versions of the DCD/UCD messages are set as specific fixed values (first values) in the transmitted DCD/UCD information in a manner different from that specified in the existing standard. The DCD CCC and UCD CCC may have different or same values. The fixed values should be set different from the values actually used in the femto BSs.

The serving macro BS periodically broadcasts radio channel information of neighbor BSs (including femto BSs), obtained through the neighbor BS information update procedure of FIG. 3, to MSs in the coverage using an NBR-ADV message, and each MS measures signal strength for each neighbor BS using radio channel information (e.g., center frequency, bandwidth, FFT size, preamble index, frame duration) of neighbor BSs, acquired from the NBR-ADV message received from its serving BS. The measured signal strength includes at least one of, for example, RSSI and CINR.

Signal strengths of the neighbor BSs are compared with a signal strength measured for the serving BS, and one or more neighbor BSs are selected as handover candidate BSs according to the comparison results. An MS finally selects one target BS by itself or by undergoing a handover preparation phase with the serving BS, and performs handover ranging to acquire synchronization with the target BS and set appropriate transmit power. Thereafter, the prescribed remaining procedure is performed to finalize the connection setup to the target BS.

The above-described operation may be achieved by installing a memory device storing the program codes in the femto ASN-GW. That is, the femto ASN-GW implements the above-mentioned operation by reading and executing the program codes stored in the memory device by means of a processor or a Central Processing Unit (CPU). Now, a description will be made of an exemplary structure of a femto ASN-GW for performing the above neighbor BS information management operation.

Figure 4:
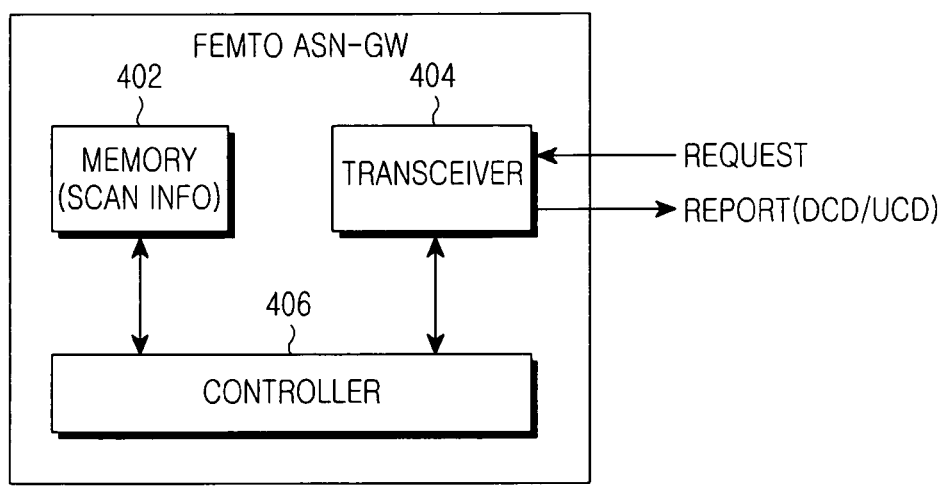
FIG. 4 is a block diagram showing a structure of a femto ASN-GW according to an exemplary embodiment of the present invention.

FIG. 4 shows a structure of a femto ASN-GW according to an exemplary embodiment of the present invention.

As shown in the drawing, a memory 402 stores scan information required for each femto BS managed by the femto ASN-GW. Upon request from a serving BS, or upon receiving a request to transmit DCD/UCD information in a periodic or event-driven manner, a controller 406 reads out the scan information from the memory 402, generates DCD/UCD information including the scan information, creates a Radio_Config_Update_Rpt message including the DCD/UCD information, and transfers the information to a transceiver 404. DCD CCC and UCD CCC in the DCD/UCD information are set as specific values (first values) unused in the femto network. Recognizing the need to update the DCD/UCD information based on the values of DCD CCC and UCD CCC, an MS may receive the DCD/UCD information of the femto network before performing handover ranging to a femto BS. The Radio_Config_Update_Rpt message is delivered by the transceiver 404 to the serving macro BS via a macro ASN-GW.

Meanwhile, like the macro BS, a femto BS periodically transmits all the necessary radio channel information including SCAN INFO and information changeable by itself by the SON function, using DCD/UCD messages. However, unlike the specific values (first values) transferred to the macro network by the femto ASN-GW, DCD CCC and UCD CCC in the DCD/UCD messages transmitted by the femto BS are set as, for example, second values allowing an MS to receive the DCD/UCD messages before entering the femto BS and performing handover ranging. That is, by receiving the DCD/UCD messages from the femto BS, the MS may acquire all the radio channel information including SCAN INFO. DCD CCC and UCD CCC may have the same or different values.

Since the MS receives the DCD/UCD messages during a handover process, it is preferable that the femto BS transmits messages including the DCD/UCD information at a period shorter than that of the macro BS in order to reduce a handover delay time. For example, in the IEEE 802.16e system, if a handover delay time increases by 50 ms on average in a bandwidth of 10 MHz, i.e., if DCD/UCD messages are transmitted at a period of 100 ms, then the BS capacity is reduced 5% or less.

Figure 5:
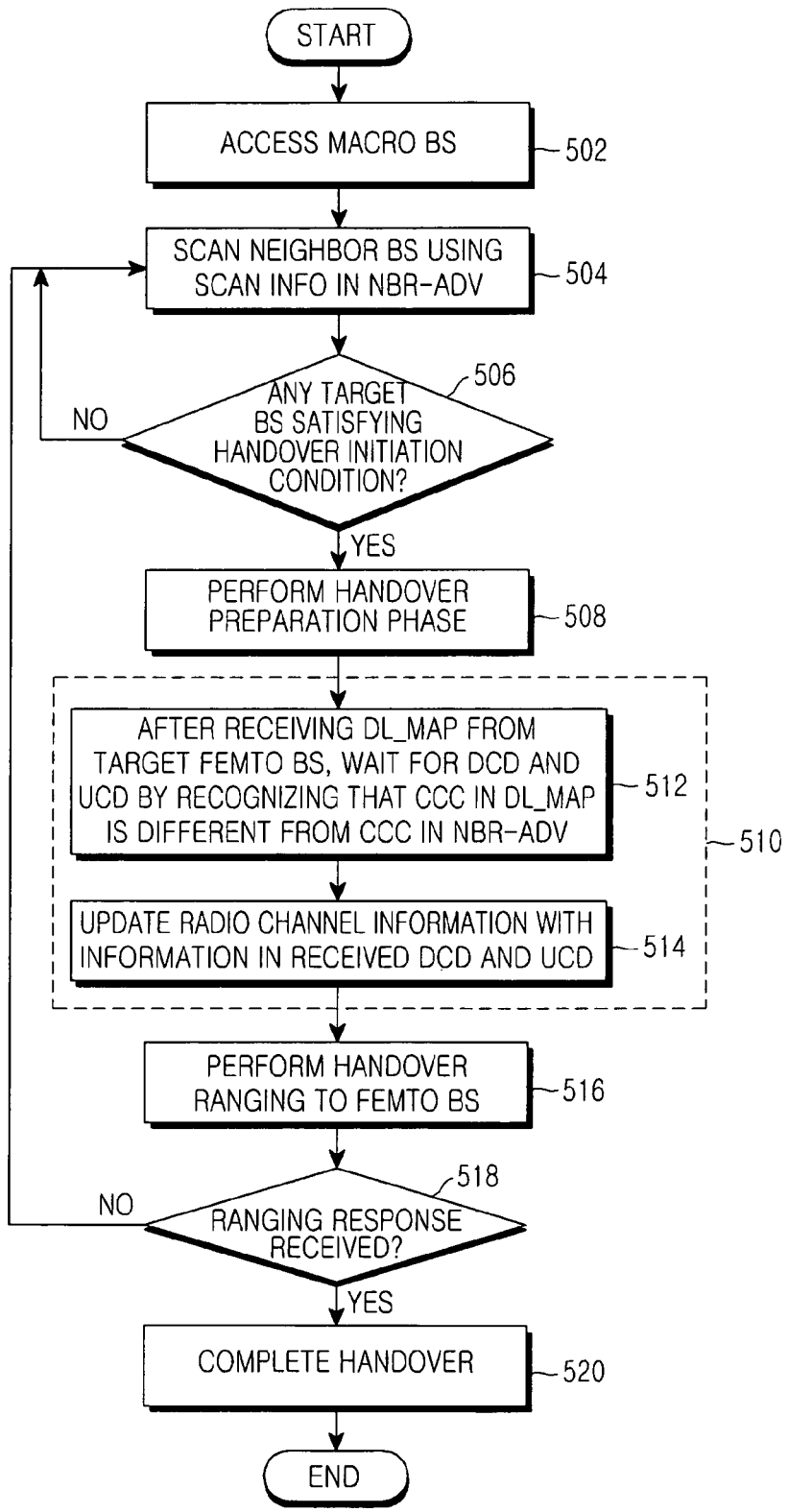
FIG. 5 is a flowchart showing a handover operation of an MS according to an exemplary embodiment of the present invention.

FIG. 5 shows a handover operation of an MS according to an exemplary embodiment of the present invention, in which an MS, which has been accessing a macro BS, performs handover while moving to a femto BS.

As shown in the figure, an MS has been accessing a macro BS in block 502. In block 504, the MS receives from the macro BS an NBR-ADV message including scan information for neighbor BSs and femto BSs, and scans neighbor BSs using the scan information. Based on the neighbor BS scanning results, the MS determines in block 506 whether there is a target femto BS satisfying a predetermined handover initiation condition. In the absence of the target femto BS, the MS returns to block 504, and in the presence of the target femto BS, the MS proceeds to block 508. The handover initiation condition is determined depending on the comparison made between signal strengths measured for the neighbor BSs and a signal strength measured for the serving BS, and detailed descriptions thereof will be omitted for simplicity.

In block 508, the MS performs a handover preparation phase, which can be optionally performed only for controlled handover.

In block 510, the MS acquires radio channel information for handover to the target femto BS. To be specific, in block 512, the MS receives a DL MAP message indicating allocation of DL resources from the target femto BS, acquires CCC from the DL MAP message, and waits for DCD/UCD messages after recognizing that the CCC acquired from an NBR-ADV message received from the serving macro BS is different from the CCC acquired from the DL MAP message. In block 514, the MS receives DCD/UCD messages from the target femto BS, and updates the pre-stored radio channel information with DCD/UCD information in the received DCD/UCD messages.

The MS performs handover ranging to the target femto BS using the updated radio channel information in block 516, and determines in block 518 whether a response to the handover ranging is received from the target femto BS. Upon failure to receive the ranging response, the MS returns to block 504 to search for another target BS. However, upon receiving the ranging response, the MS completes the handover to the target femto BS in block 520.

As is apparent from the foregoing description, in a femto scenario incapable of applying the neighbor BS information update used in the existing macro network, the present invention provides interworking operation between network components in the femto network for neighbor BS information update, without a change not only in the standard interface of the macro network but also in the air interface between the femto BS and the exiting MS. By doing so, the present invention enables handover from the macro network to the femto network while minimizing the possible change in the existing system configuration without increasing the load of the macro BS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing neighbor Base Station (BS) information in a mobile communication system, comprising:
    managing scan information for which a Mobile Station (MS) needs in measuring at least one signal strength by scanning at least one femto BS, by a femto Access Service Network-Gateway (ASN-GW) managing the at least one femto BS;
    creating, by the femto ASN-GW, the scan information in a format of Downlink Channel Descriptor (DCD) and Uplink Channel Descriptor (UCD) information and transmitting the scan information to a macro BS serving the MS; and
    periodically broadcasting, by the macro BS, neighbor BS information including the scan information to Mobile Stations in a coverage of the macro BS using a Neighbor Advertisement (NBR-ADV) message.

2. The method of claim 1, wherein the scan information includes at least one of a center frequency, a preamble index, a bandwidth, a Fast Fourier Transform (FFT) size, a frame duration, and a BS Identifier (ID), which are used in each femto BS.

3. The method of claim 1, wherein the DCD and UCD information includes the scan information, a DCD Configuration Change Count (CCC), and a UCD CCC, and the DCD CCC and the UCD CCC are set as first values unused in a femto network.

4. The method of claim 3, wherein the DCD and UCD information further includes other radio channel information not including the scan information, the DCD CCC and the UCD CCC, and the other radio channel information is set to an arbitrary value within a predetermined range.

5. The method of claim 3, further comprising periodically transmitting, by each femto BS, DCD and UCD messages including radio channel information of each femto BS, wherein a DCD CCC and a UCD CCC in the DCD and UCD messages are set as second values different from the first values.

6. The method of claim 1, wherein the neighbor BS information includes scan information for at least one femto BS to which the MS can perform handover from the macro BS.

7. A mobile communication system for managing neighbor Base Station (BS) information, comprising:
    a macro BS configured to serve a Mobile Station (MS) in a coverage of the macro BS; and
    a femto Access Service Network-Gateway (ASN-GW) configured to control at least one femto BS, manage scan information that the MS needs in measuring at least one signal strength by scanning the at least one femto BS, create the scan information in a format of Downlink Channel Descriptor (DCD) and Uplink Channel Descriptor (UCD) information, and transmit the scan information to the macro BS;
    wherein the macro BS periodically broadcasts neighbor BS information of the at least one femto BS, which includes the scan information, to Mobile Stations in the coverage using a Neighbor Advertisement (NBR-ADV) message.

8. The mobile communication system of claim 7, wherein the scan information includes at least one of a center frequency, a preamble index, a bandwidth, a Fast Fourier Transform (FFT) size, a frame duration, and a BS Identifier (ID), which are used in each femto BS.

9. The mobile communication system of claim 7, wherein the DCD and UCD information includes the scan information, a DCD Configuration Change Count (CCC), and a UCD CCC, and the DCD CCC and the UCD CCC are set as first values unused in a femto network.

10. The mobile communication system of claim 9, wherein the DCD and UCD information further includes other radio channel information not including the scan information, the DCD CCC and the UCD CCC, and the other radio channel information is set to an arbitrary value within a predetermined range.

11. The mobile communication system of claim 9, wherein the femto BS periodically transmits DCD and UCD messages including radio channel information of each femto BS, wherein a DCD CCC and a UCD CCC in the DCD and UCD messages are set as second values different from the first values.

12. The mobile communication system of claim 7, wherein the neighbor BS information includes scan information for at least one femto BS to which the MS can perform handover from the macro BS.

13. A mobile communication system for managing neighbor Base Station (BS) information, comprising:
    a femto Access Service Network-Gateway (ASN-GW) configured to:
    control at least one femto BS;
    create scan information in a format of Downlink Channel Descriptor (DCD) and Uplink Channel Descriptor (UCD) information, the scan information being information used by a Mobile Station (MS) to scan the at least one femto BS in order to measure at least one signal strength of the at least one femto BS; and
    transmit the scan information to a macro BS.

14. The mobile communication system of claim 13, wherein the scan information includes at least one of a center frequency, a preamble index, a bandwidth, a Fast Fourier Transform (FFT) size, a frame duration, and a BS Identifier (ID), which are used in each femto BS.

15. The mobile communication system of claim 13, wherein the DCD and UCD information includes the scan information, a DCD Configuration Change Count (CCC), and a UCD CCC, wherein the DCD CCC and the UCD CCC are set as first values unused in a femto network.

16. The mobile communication system of claim 13, wherein the neighbor BS information includes scan information for at least one femto BS to which the MS can perform handover from the macro BS.

17. A mobile communication system for managing neighbor Base Station (BS) information, comprising:

a macro BS configured to:

serve a Mobile Station (MS) in a coverage of the macro BS;

receive scan information in a format of Downlink Channel Descriptor (DCD) and Uplink Channel Descriptor (UCD) information from a femto Access Service Network-Gateway (ASN-GW) controlling a femto BS, the scan information being information used by the MS to scan the at least one femto BS in order to measure at least one signal strength of the at least one femto BS; and periodically broadcast neighbor BS information of the at least one femto BS, which includes the scan information, to Mobile Stations in the coverage using a Neighbor Advertisement (NBR-ADV) message.

18. The mobile communication system of claim 17, wherein the scan information includes at least one of a center frequency, a preamble index, a bandwidth, a Fast Fourier Transform (FFT) size, a frame duration, and a BS Identifier (ID), which are used in each femto BS.

19. The mobile communication system of claim 17, wherein the DCD and UCD information includes the scan information, a DCD Configuration Change Count (CCC), and a UCD CCC, and the DCD CCC and the UCD CCC are set as first values unused in a femto network.

20. The mobile communication system of claim 17, wherein the neighbor BS information includes scan information for at least one femto BS to which the MS can perform handover from the macro BS.

* * * * *